United States Patent
Hui et al.

(10) Patent No.: US 8,793,638 B2
(45) Date of Patent: Jul. 29, 2014

(54) METHOD OF OPTIMIZING DESIGN FOR MANUFACTURING (DFM)

(75) Inventors: Keuing Hui, Hsinchu (TW); Yen-Wei Cheng, Hsinchu (TW); Yen-Di Tsen, Chung-Ho (TW); Jong-I Mou, Hsinpu Township, Hsinchu County (TW); Chin-Hsiang Lin, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/559,081

(22) Filed: Jul. 26, 2012

(65) Prior Publication Data
US 2014/0033159 A1     Jan. 30, 2014

(51) Int. Cl.
*G06F 17/50*     (2006.01)

(52) U.S. Cl.
USPC ................ 716/132; 716/55; 716/101; 703/14

(58) Field of Classification Search
CPC .................................. G06F 17/50; G06F 9/455
See application file for complete search history.

(56) References Cited

U.S. PATENT DOCUMENTS

| 7,076,415 | B1 * | 7/2006 | Demler et al. | ................... | 703/14 |
| 7,515,977 | B2 * | 4/2009 | Eryurek et al. | ................. | 700/83 |

* cited by examiner

*Primary Examiner* — Thuan Do
(74) *Attorney, Agent, or Firm* — Haynes and Boone, LLP

(57) ABSTRACT

The present disclosure describes a method of optimizing a design for manufacture (DFM) simulation. The method includes receiving an integrated circuit (IC) design data having a feature, receiving a process data having a parameter or a plurality of parameters, performing the DFM simulation, and optimizing the DFM simulation. The performing the DFM simulation includes generating a simulation output data using the IC design data and the process data. The optimizing the DFM simulation includes generating a performance index of the parameter or the plurality of parameters by the DFM simulation. The optimizing the DFM simulation includes adjusting the parameter or the plurality of parameters at outer loop, middle loop, and the inner loop. The optimizing the DFM simulation also includes locating a nadir of the performance index of the parameter or the plurality of parameters over a range of the parameter or the plurality of parameters.

19 Claims, 6 Drawing Sheets

METHOD OF OPTIMIZING DESIGN FOR MANUFACTURING (DFM)

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC processing and manufacturing are needed.

For example, as a critical dimension (CD) shrinks accompanying increasing IC complexities for more integrated functionality, it is ever more risky financially to manufacture semiconductor devices at advanced nodes. Thus, it is important that early warnings be enabled to detect hot spots of potential faults like openings or bridges in the printed patterns of geometric layouts on wafers. A design for manufacturability (DFM) simulation is design for a software tools for this early detection of potential faults during the design stage. Accuracy of the DFM simulation is critical to ensure the prediction results for early warnings to have meaningful impacts. Accordingly, what are needed are a method and a system to improve the DFM simulation.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

DETAILED DESCRIPTION

Figure 1:
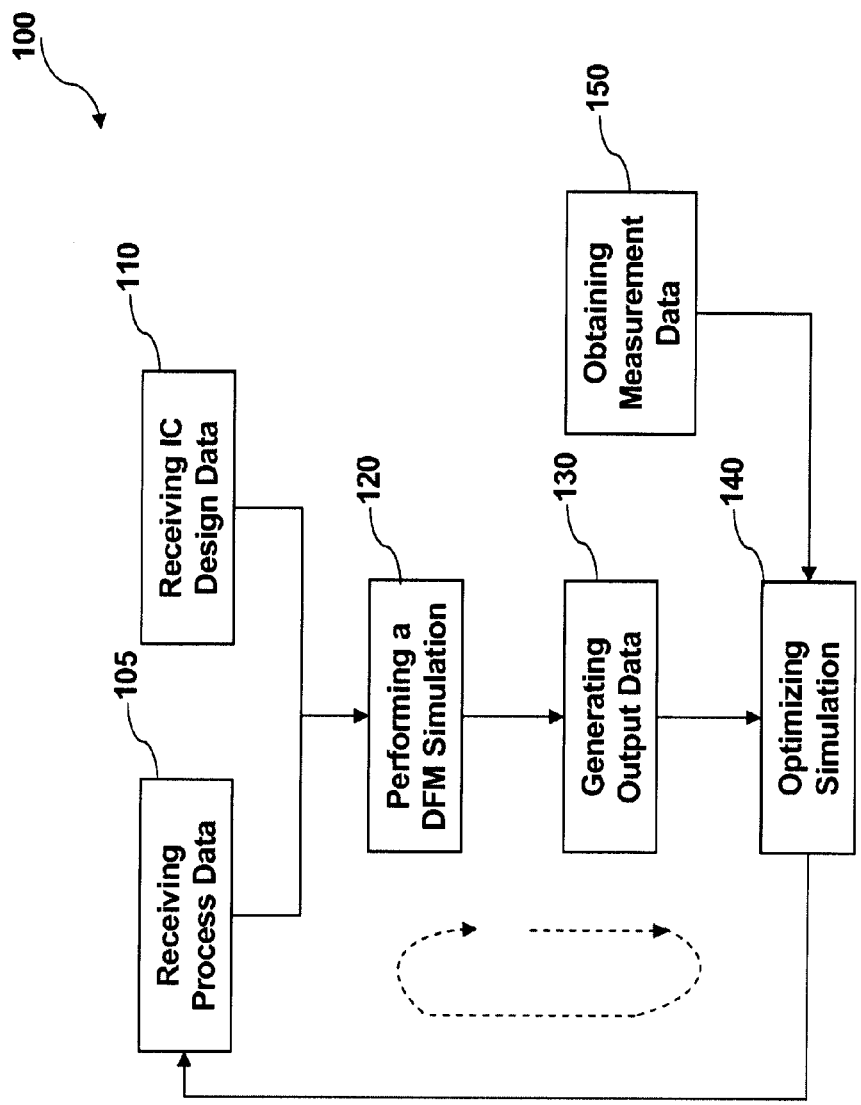
FIG. 1 represents a flow chart of a method for calibrating a design for manufacture (DFM) simulation according to one or more embodiments of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, a flow chart of a method 100 for calibrating a design for manufacture (DFM) engine is illustrated according to one or more embodiments of the present disclosure. The method 100 includes beginning with two operations, such as operation 105 and operation 110. The method 100 begins at operation 105 by providing or receiving IC design layout data (or IC design layout pattern) from circuit files from a designer or a customer. The designer can be a separate design house or can be part of a semiconductor fabrication facility (fab) for making IC devices according to the IC design layout. In various embodiments, the semiconductor fab may be capable of making photomasks, semiconductor wafers, or both. The IC design layout includes various geometrical patterns designed for an IC product and based on a specification of the IC product.

The IC design layout is presented in one or more data files having the information of the geometrical patterns. In one example, the IC design layout is expressed in a "gds" format. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines and vias of an interlayer interconnection, and openings for bonding pads, to be formed in and on a semiconductor substrate (such as a silicon wafer) and various material layers disposed over the semiconductor substrate. The IC design layout may include certain assist features, such as for imaging effect, processing enhancement, and/or mask identification information.

As shown in FIG. 1, the method 100 also begins at operation 110 by receiving process data. The process data includes physical models of processes, process tool parameter settings, process recipes setup data, and other model parameters. The process data includes a plurality of parameters to be calibrated or recalibrated. In one embodiment, the process includes depositing a silicon oxide film on a substrate. The parameters of process data of depositing the silicon oxide film on the substrate include thickness of the silicon oxide, depositing rate, and deposition time, depositing temperature, and chemical composition. In another embodiment, the process includes a chemical mechanical polishing (CMP) process. The parameters of process data of the CMP includes the polishing rate, polishing pressure, polishing time, target thickness and associated step height. In other embodiment, the process includes forming a pattern on the substrate. The process of forming the pattern on the substrate includes coating a resist film on the substrate, exposing the resist film coated on the substrate, developing the exposed resist film to form a resist pattern on the substrate, and etching the resist pattern to form the pattern on the substrate. The parameters of process data of coating the resist film include thickness of the resist film, spin speed, and soft bake temperature. The parameters of process data of exposing the resist film include lens illumination aperture, lens focus offset, exposing dose, and alignment strategy. The parameters of process data of developing the exposed resist film include the post exposure bake temperature and time, and the developing puddle time. The parameters of process data of etching includes etching chemical composition, radio frequency (RF) power and voltage, bias voltage, and etching rate and time. In yet another embodiment, the process includes forming metal layers and vias as interconnects. The parameters of process data of the metal layers and vias include the numbers and types of the metal layers, vias and properties of the insulating layers separating the metal interconnect.

The method 100 proceeds to operation 120 for performing a DFM simulation on a DFM engine using the IC design layout data and the process data with a set of parameter settings. The DFM engine includes a computer and software operating the computer and running the DFM simulation. The method 100 proceeds to operation 130 for generating an output data. The output data includes all simulation results, for example, a calculated critical dimension (CD) of a feature or a calculated thickness of a film deposited on the wafer by the simulation, generated on the DFM engine for the given set of parameter settings, for example, the exposing dose, the etching rate and time, or a film depositing time.

The method 100 proceeds to operation 140 for optimizing the DFM simulation. At operation 140, the method 100 also includes receiving measurement data obtained at operation 150. The measurement data includes actual measurements from a processed wafer. The wafer is processed by a process and/or an operation unit on a tool. The measurement data may include an actual critical dimension (CD) of a feature on the wafer or an actual thickness of a film deposited on the wafer. In some embodiments, the output data at operation 130 and the measurement data at operation 150 may be converted to a common format, for example, ASCII format or CSV format, for general portability across computing platforms.

As shown in FIG. 1, the optimizing simulation at operation 140 executes by using an optimization engine. The optimization engine is constructed on a computing platform, for example, on MS-Windows or on Linux. The optimization engine may use another computing platform or share a common computing platform with the DFM engine. The optimizing simulation at operation 140 includes integrating three sub-operations, such as evaluating the simulation output data and the measurement data on the wafer, making a decision based on the evaluation, and adjusting the parameter settings for the DFM engine based on the decision. In some embodiments, an adjusted parameter setting is also referred to as a calibrated parameter setting. The calibrated parameter setting is sent to operation 105 again to set a new set of parameter settings for the process data. The process data with the new set of parameter settings is sent to operation 120 to perform the DFM simulation using the new parameter settings. A new output data is generated at operation 130 using the calibrated parameter settings. The new output data is sent to operation 140 for optimizing the simulation. The new set of parameter settings is re-calibrated. This cycle can be performed many times until the parameter settings are well tuned and optimized, and a satisfactory DFM simulation output data is generated. Additional operations can be provided before, during, and after the method 100, and some the operations described can be replaced, eliminated, or moved around for additional embodiments of the method 100.

In one embodiment, the DFM engine and the optimization engine can exist on the same computing platform, for example, LINUX. A supervisory architecture integrates the entire calibration process and takes control of the data flows with two engines serving as function providers. In another embodiment, the DFM engine and the optimization engine are constructed on different computing platforms, for example, the DFM engine on MS-WINDOW and the optimization engine on LINUX. A supervisory loop is constructed for managing distributing computing services and data across the different platform.

Figure 2:
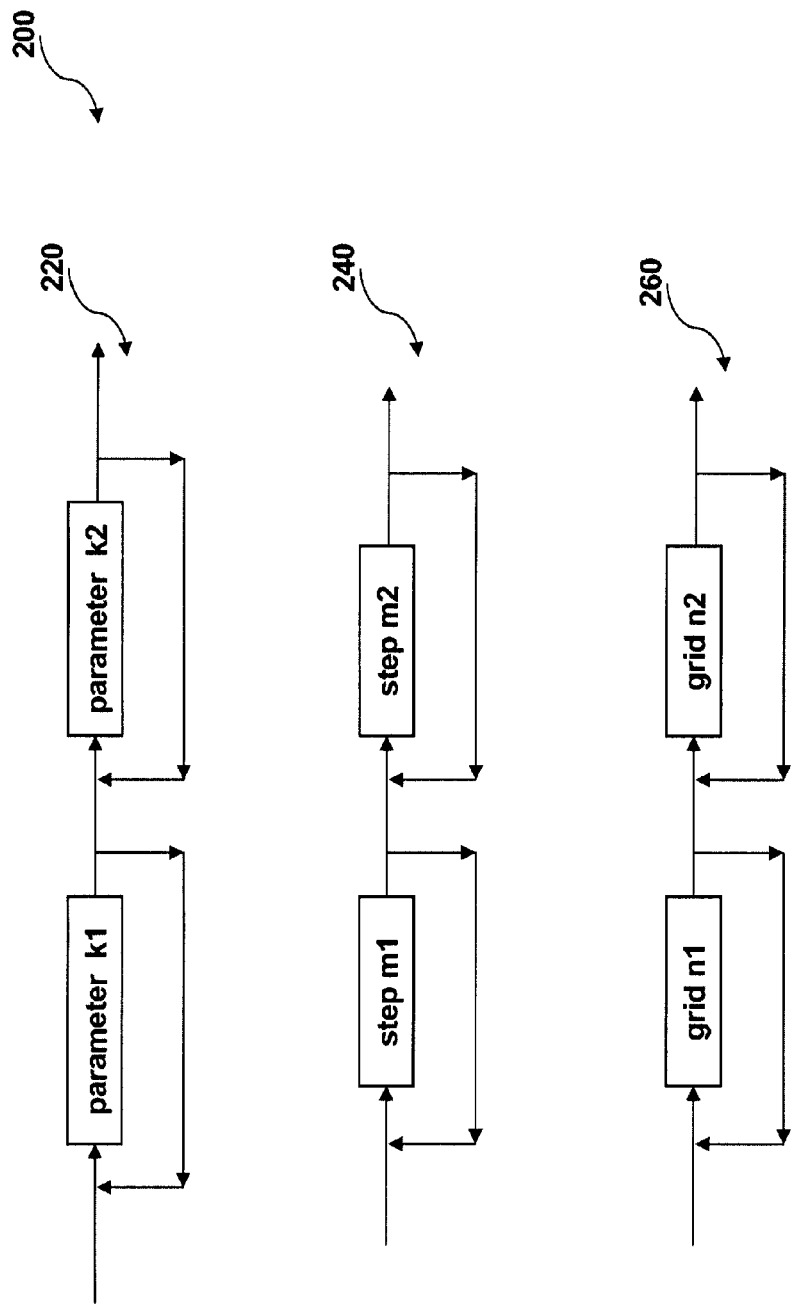
FIG. 2 represents a sequence of calibration procedures of a supervisory layer in a method according to one or more embodiments.

Referring now to FIG. 2, a sequence 200 of calibration procedure of the supervisory layer in the method 100 is illustrated according to one or more embodiments. The sequence 200 includes an outer loop 220, a middle loop 240, and an inner loop 260. The outer loop 220 includes multiple parameters k, k={1 ... n}, for each calibration. The middle loop 240 includes multiple steps m, m={m1, m2 ... }, for each parameter k. The inner loop 260 includes multiple levels of resolution grid (minimum increment change in a parameter setting) n, n={n1, n2,}, for each step m. In some embodiments, each parameter k is divided into m steps for middle level calibration. Each step m is divided into n grids for fine calibration. System architecture of the optimization engine is built to enable three tiers of the outer loop 220, middle loop 240, and inner loop 260 to be calibrated in single parameter for sequential calibration or multiple parameters for parallel calibration. More nested loops may be added for other instantiations of the supervisory architecture concerning the exact numbers of recipe steps, resolution grids, and other factors of importance.

In the present embodiments, a performance index $J(\Phi;\omega)$ of the DFM simulation is introduced. The performance index $J(\Phi;\omega)$ of the DFM simulation is defined as $$J(\Phi;\omega)=\Sigma_{\forall(x,y)}\{\Sigma_{\forall k}\omega_k\cdot[z_k(x,y)-\hat{z}_k(x,y)]^2\} \qquad \text{Eq. (1)}$$

wherein the (x, y) are coordinates about areas of interests on the wafer, the $\hat{z}(x, y)$ are output values from the DFM simulation at the point (x, y), z(x, y) are physical measurements from silicon wafer at the point (x, y), $\Phi$ is vector of model parameters to be calibrated, $\Phi_0$ is vector of model parameters optimally calibrated, $\omega$ is vector of dynamic weighting of performance index, and $J(\Phi;\omega)$ is performance index of DFM engine under calibration. The optimization objective is to find $\Phi_0$, so that $$J(\Phi_0) \leq J(\Phi) \forall \Phi \qquad \text{Eq. (2)}$$

The number of model parameter $\Phi$ to be calibrated may rank in thousands. The model parameter $\Phi$ may include polishing rate, removing rate, and target thickness in the CMP process; etching rate, etching time, RF power, RF frequency, and bias voltage in the etching process; and resist thickness, exposing dose, bake temperature and time in the lithography process. Some of the model parameters may depend on the individual design of a semiconductor device, process specifications or configuration, or settings of processing equipment.

In one embodiment, the performance index may be defined via mappings between simulation results and silicon data, $$\hat{z}(x,y)=F[z(x,y);\theta] \qquad \text{Eq. (3)}$$

$$J(\Phi;\omega,\theta)=\Sigma_{\forall k}\omega_k f_k(\theta) \qquad \text{Eq. (4)}$$

wherein the F[z; θ] is mapping between simulation result and silicon data, the θ is vector of mapping parameters to be optimally tuned, and f(θ) is appropriate cost function for each mapping parameter. This embodiment simplifies the optimization process by summarizing the spatial mapping between the DFM simulation and the silicon data, for example, a linear mapping with coefficient of determination is presented by Eq. (5), $$\hat{z}(x,y) = a \cdot z(x,y) + b r^2$$ Eq. (5)

in this particular case $$\theta = \{a, b, r\}$$ Eq. (6)

Least-square fits may be used to obtain $\{a, b\}$ and calculate $\{r\}$ accordingly. Ideally the best fit would give slope $a=1$ and intercept $b=0$ with $r=1$.

Figure 3:
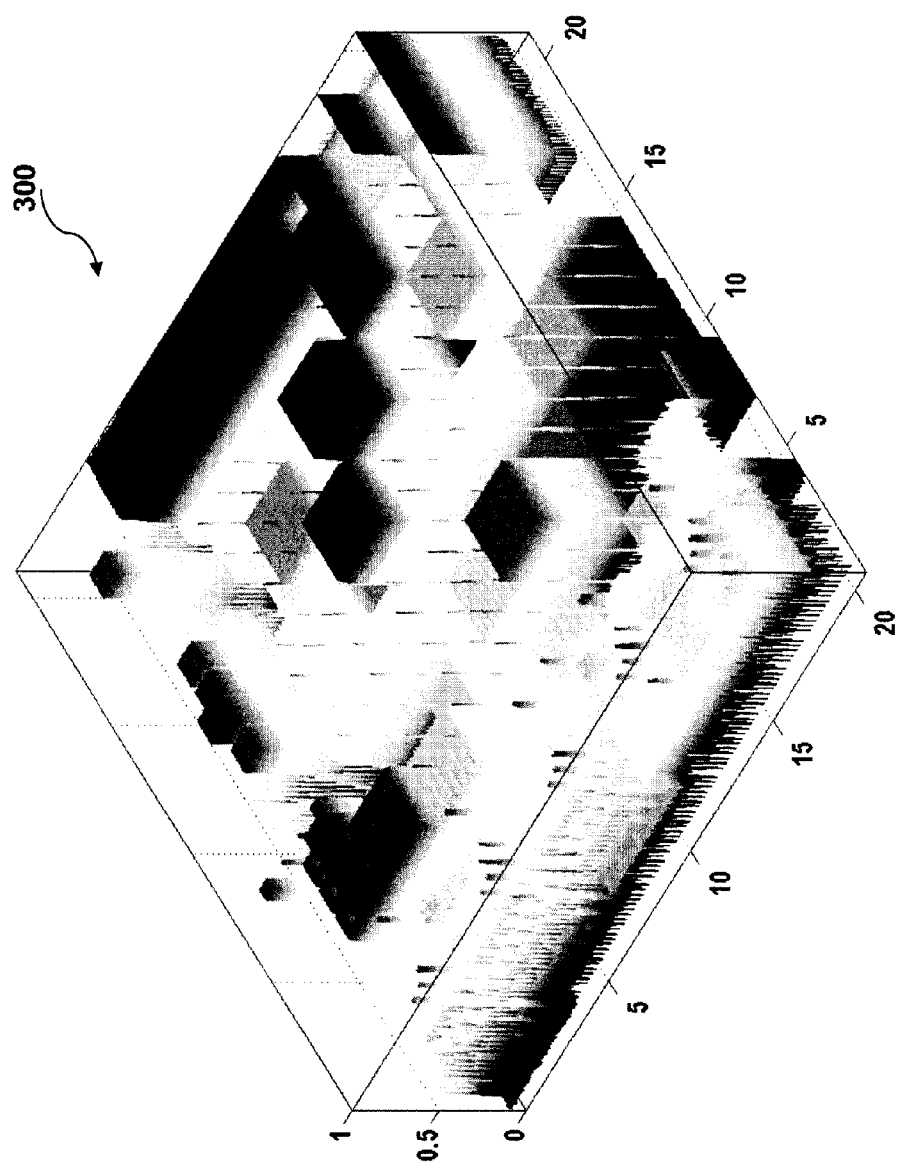
FIG. 3 represents an example of a density profile by a design for manufacture (DFM) simulation according to one or more embodiments.

In one embodiment, the optimization process may be illustrated by a density profile 300. The density profile 300 is shown in FIG. 3. A performance index $J_1(\omega)$ may take the form for unconstrained optimization, $$J_1(\omega) = \sqrt{\omega \cdot (z_1 - \hat{z}_1)^T \cdot (z_1 - \hat{z}_1) + (1 - \omega) \cdot (z_2 - \hat{z}_2)^T \cdot (z_2 - \hat{z}_2)}$$ Eq. (7)

wherein $z_1$ is measured dielectric thickness, $z_2$ is measured metal thickness, and $\{\hat{z}_1, \hat{z}_2\}$ are simulated values of $\{z_1, z_2\}$. Or, a performance index $J_2(\omega)$ may take the form for constrained optimization by Eq. (5), $$J_2(\omega) = \sqrt{\omega \cdot (1-\alpha)^2 + (1-\omega) \cdot (1-r^2)}$$ Eq. (8)

wherein $0 \leq \omega \leq 1$, and the sample boundary constraints is $$a \in 1 \pm 0.08 \ r^2 \geq 0.85$$

Figure 4:
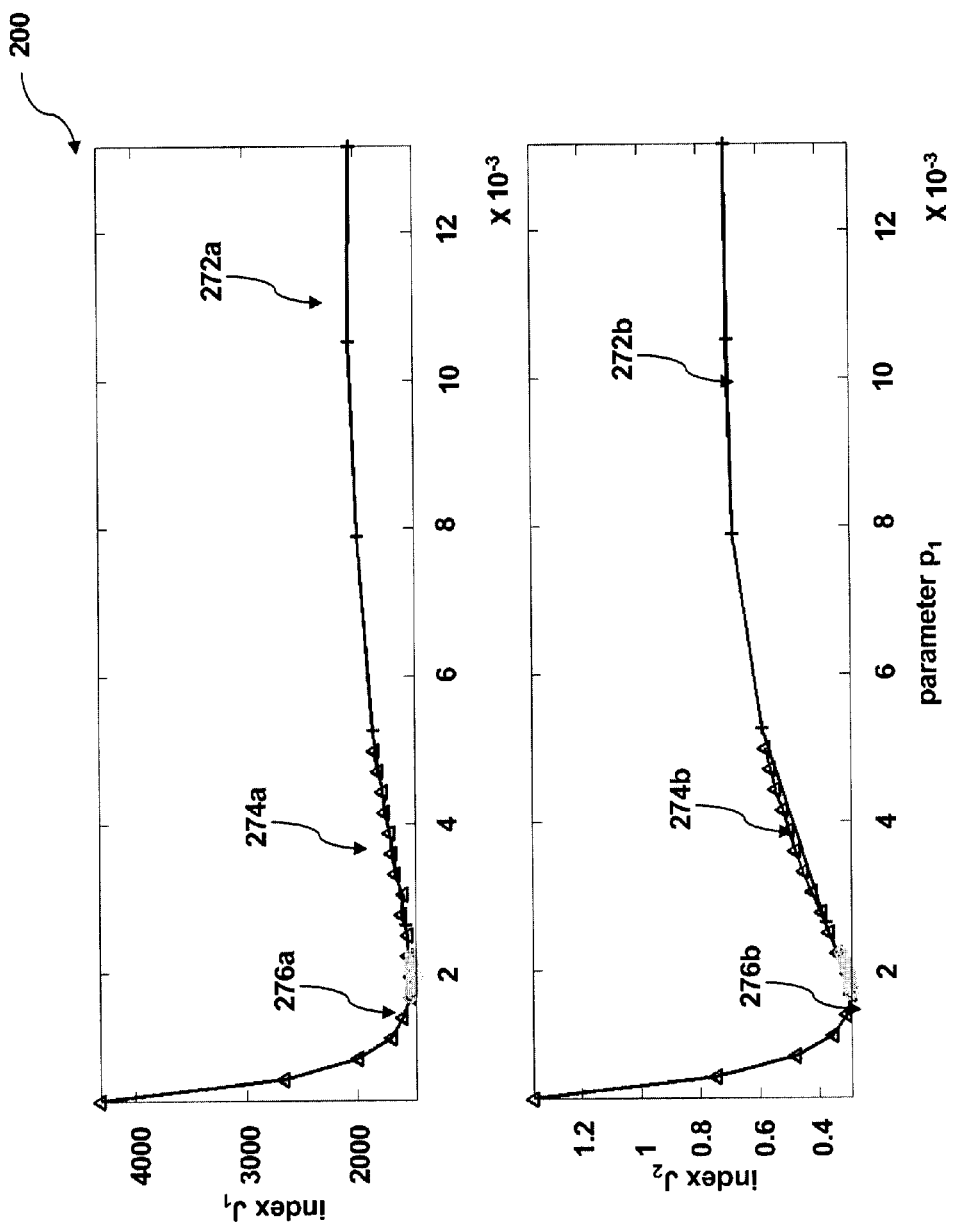
FIGS. 4-5 represent examples of optimizing parameters by a DFM simulation for implementing one or more embodiments.

Referring now to FIG. 4, an example of optimizing a parameter $p_1$ using the sequence 200 is presented according to one or more embodiments. As shown in FIG. 4, the example includes optimizing the parameter $p_1$ using the performance index $J_1(\omega)$ by the unconstrained optimization presented in Eq. (7) or using the performance index $J_2(\omega)$ by the constrained optimization presented in Eq. (8). The example also includes using the sequence 200 shown in FIG. 2 to optimize the parameter $p_1$. First, curves 272a and 272b are calculated using the outer loop 220 of the sequence 200. Both curves 272a and 272b give a range of the parameter $p_1$ for the performance index $J_1(\omega)$ and $J_2(\omega)$ respectively. Then, curves 274a and 274b are calculated using the middle loop 240 of the sequence 200 based on the range of the parameter $p_1$ given by the outer loop 220 of the sequence 200. The curves 274a and 274b narrow the range of the parameter $p_1$ for the performance index $J_1(\omega)$ and $J_2(\omega)$ respectively. Finally, curves 276a and 276b are calculated using the inner loop 260 of the sequence 200 based on the range of the optimal setting of the parameter $p_1$ given by the middle loop 240 of the sequence 200. The curves 276a and 276b further narrow the range of the parameter $p_1$ for the performance index $J_1(\omega)$ and $J_2(\omega)$ respectively.

As shown in FIG. 4, in one embodiment, the optimal performance index $J_1(\omega)$ of the parameter $p_1$ is optimized by choosing a nadir of the curve 276a. The performance index $J_1(\omega)$ is optimized using Eq. (7) by an unconstraint approach. The optimal setting of the parameter $p_1$ is determined by locating the nadir of the performance index $J_1(\omega)$. An optimal range of the parameter $p_1$ is also determined by the optimizing process. In another embodiment, the optimal performance index $J_2(\omega)$ of the parameter $p_1$ is optimized by choosing a nadir of the curve 276b. The performance index $J_2(\omega)$ is optimized using Eq. (8) by a constraint approach. The optimal setting of the parameter $p_1$ is determined by locating the nadir of the performance index $J_2(\omega)$. An optimal range of the parameter $p_1$ is also determined by the optimizing process. Different embodiments may have different advantages, and no particular advantage is necessarily required for any embodiment.

Figure 5:
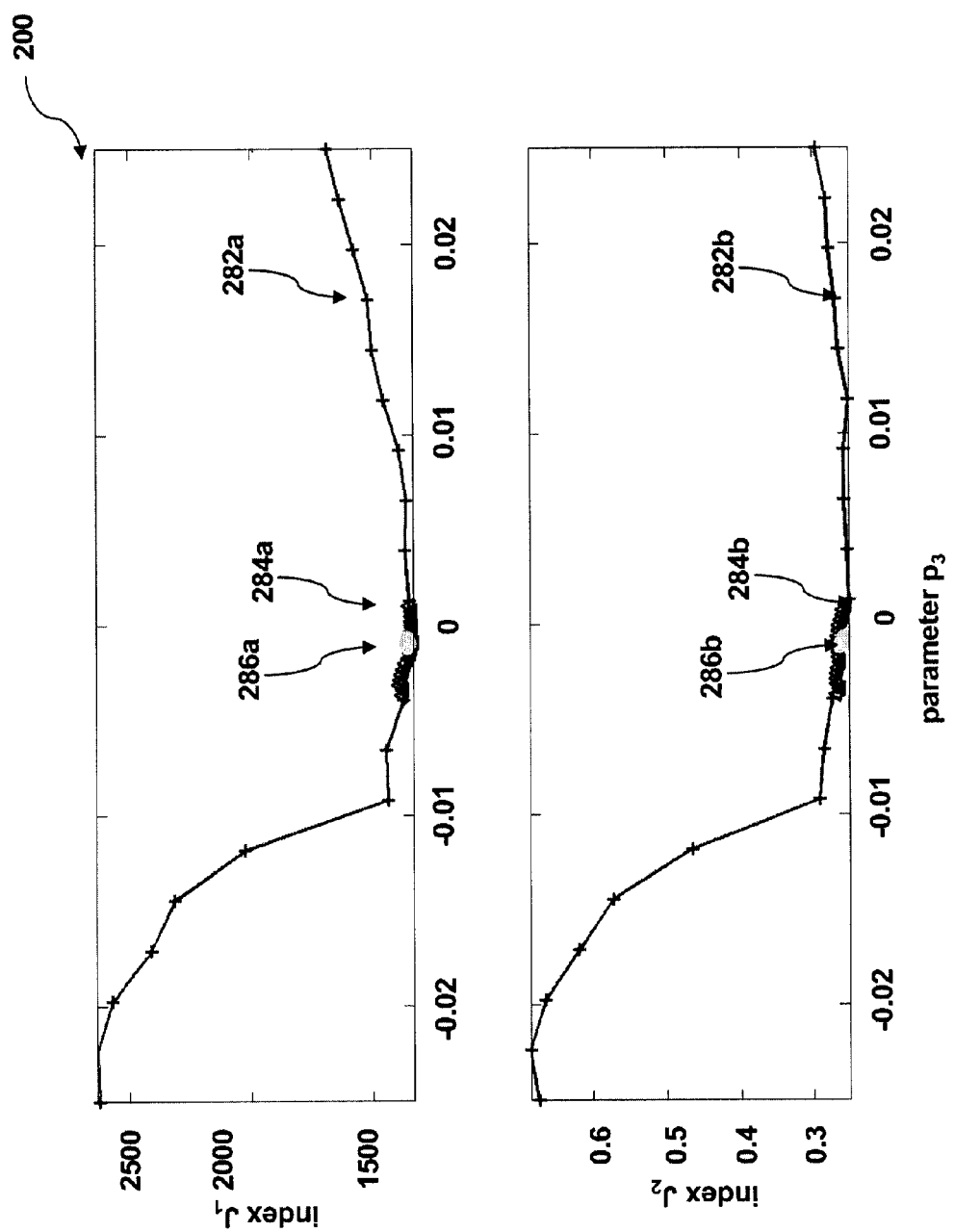

FIG. 5 shows graphs of optimizing a parameter $p_3$ using the sequence 200 is presented according to one or more embodiments. As shown in FIG. 5, the example includes optimizing the parameter m using the performance index $J_1(\omega)$ by the unconstrained optimization presented in Eq. (7) or using the performance index $J_2(\omega)$ by the constrained optimization presented in Eq. (8). The example also includes using the sequence 200 shown in FIG. 2 to optimize the parameter $p_3$. First, curves 282a and 282b are calculated using the outer loop 220 of the sequence 200. Both curves 282a and 282b give a range of the parameter $p_3$ for the performance index $J_1(\omega)$ and $J_2(\omega)$ respectively. Then, curves 284a and 284b are calculated using the middle loop 240 of the sequence 200 based on the range of the parameter $p_3$ given by the outer loop 220 of the sequence 200. The curves 284a and 284b narrow the range of the parameter $p_3$ for the performance index $J_1(\omega)$ and $J_2(\omega)$ respectively. Finally, curves 286a and 286b are calculated using the inner loop 260 of the sequence 200 based on the range of the optimal setting of the parameter $p_3$ given by the middle loop 240 of the sequence 200. The curves 286a and 286b further narrow the range of the parameter $p_3$ for the performance index $J_1(\omega)$ and $J_2(\omega)$ respectively. The optimal setting of the parameter $p_3$ is determined (or tuned) by either the performance index $J_1(\omega)$ or by the performance index $J_2(\omega)$.

As shown in FIG. 5, in one embodiment, the optimal performance index $J_1(\omega)$ of the parameter $p_3$ is optimized by choosing a nadir of the curve 286a. The performance index $J_1(\omega)$ of the parameter $p_3$ is optimized using Eq. (7) by the unconstraint approach. The optimal setting of the parameter $p_3$ is determined by locating the nadir of the performance index $J_1(\omega)$ of the parameter $p_3$. An optimal range of the parameter $p_1$ is also determined by the optimizing process. In another embodiment, the optimal performance index $J_2(\omega)$ of the parameter $p_3$ is optimized by choosing a nadir of the curve 286b. The performance index $J_2(\omega)$ of the parameter $p_3$ is optimized using Eq. (8) by the constraint approach. The optimal setting of the parameter $p_3$ is determined by locating the nadir of the performance index $J_2(\omega)$ of the parameter $p_3$. An optimal range of the parameter $p_3$ is also determined by the optimizing process. Different embodiments may have different advantages, and no particular advantage is necessarily required for any embodiment.

Figure 6:
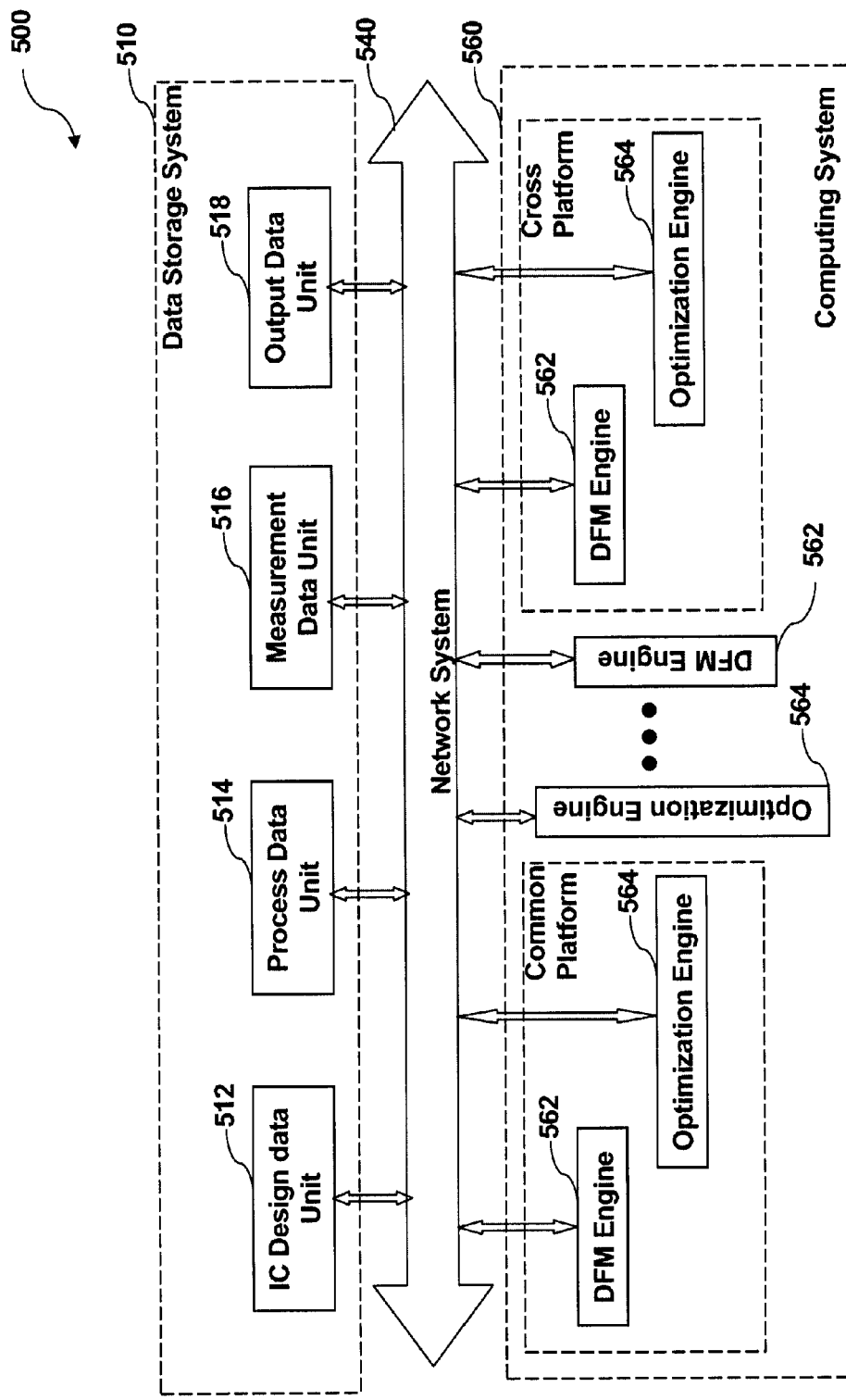
FIG. 6 is a block diagram of a system for optimizing a DFM simulation is illustrated according to one or more embodiments of the present disclosure.

Referring now to FIG. 6, a block diagram of a system 500 for optimizing the DFM simulation is illustrated according to one or more embodiments. The system 500 includes a data storage system 510, a network system 540, and a computing system 560. The data or file exchanges between the data storage system 510 and the computing system 560 through the network system 540. The data storage system 510 includes a plurality of memory units. The data storage system 510 further includes the IC design data unit 512 for storing the IC design data, the process data unit 514 for storing the process data, the measurement data unit 516 for storing measurement data, and the output file unit 518 for storing the output file. The IC design data unit 512, the process data unit 514, the measurement data unit 516, and the output file unit 518 are configured to connect to the network system 540 respectively. The computing system 560 includes a DFM engine 562 and an optimization engine 564. The computing system 560 may include more than one DFM engine 562 or more than one optimization engine 564. The DFM engine 562 is configured to connect to the network system 540. The optimization engine 564 is configured to connect to the network system 540. The DFM engine 562 may include a computer. The optimization engine may also include a computer. The DFM engine 562 and the optimization engine 564 may be constructed on the same common platform (e.g. both on MS-window or LINUX) or constructed on different platform (e.g. one on MS-WINDOW and another on LINUX). The DFM engine 562 or the optimization engine 564 may not in pair. The system architecture is very general and not necessarily limited to operating systems of MS-Windows or Linux or Unix)

As shown in FIG. 6, the system 500 is constructed for parallel computing for optimizing the DFM simulation. The DFM engine 562 gets input data, such as IC design data, process data including parameter settings, and measurement data, from the data storage system 510 through the network 540. The DFM engine 562 performs the simulation to the input data and generates the output data. The output data stored in the output data unit 518 and the measurement data stored in the measurement data unit 520 are sent to optimization engine 564 through the network 540 for optimizing the parameter setting of the process data. The optimized parameter settings of the process data is sent to the DFM engine 562 again for another cycle optimization. The computation for the simulation and the optimization are performed parallelly using the DFM engine 562 and optimization engine 564 by exchanging the data or the file through the network 560. The system 500 can reduce the optimization cycle time significantly. For example, the optimization time for optimizing a DFM engine is about several months using a traditional manual optimizing procedure. The cycle time is reduced to several days using the system 500 as shown in FIG. 6.

Thus, the present disclosure describes a method of optimizing the DFM simulation. The method includes receiving an integrated circuit (IC) design data having a feature, receiving a process data having a parameter or a plurality of parameters, performing the DFM simulation, and optimizing the DFM simulation. The method further includes receiving a measurement data. The performing the DFM simulation includes generating a simulation output data using the IC design data and the process data. The optimizing the DFM simulation includes generating a performance index of the parameter or the plurality of parameters by the DFM simulation. The generating the performance index of the parameter or the plurality of parameters includes finding the difference between the simulation output data and the measurement data. The optimizing the DFM simulation includes adjusting the parameter or the plurality of parameters at outer loop, middle loop, and the inner loop. The optimizing the DFM simulation also includes locating a nadir of the performance index of the parameter or the plurality of parameters over a range of the parameter or the plurality of parameters. The performing the DFM simulation includes performing the DFM simulation in sequential order, parallel order, or in combination of both order thereof. The optimizing the DFM simulation includes optimizing the DFM simulation in sequential order, parallel order, or in combination order thereof.

The present disclosure also describes a method of optimizing a design for manufacture (DFM) simulation. The method includes receiving an integrated circuit (IC) design data having a feature, receiving a process data having a parameter or a plurality of parameters, generating an output data by executing the DFM simulation using the IC design data and the process data, receiving a measurement data using a processed wafer, and optimizing the DFM simulation. The optimizing the DFM simulation includes generating a performance index of the parameter or the plurality of parameters by comparing the output data and the measurement data. The parameter or the plurality of parameters includes steps, and furthermore the step includes levels. The optimizing the DFM simulation includes generating the performance index of the parameter or the plurality of parameters by adjusting the parameter or the plurality of parameters of the process data. The optimizing the DFM further includes locating a nadir of the performance index. The optimizing the DFM simulation includes optimizing in a sequential order, in a parallel order, or in a combination order thereof.

In another embodiment, a system for optimizing a design for manufacture (DFM) simulation is described. The system includes a network system, a data storage system configured to connect the network, and a computing system configured to connect the network. The data storage system includes an integrate circuit (IC) design data unit, a process data unit storing the process data including parameter settings, a measurement data unit, and an output data unit. The computing system includes at least one DFM engine and at least one optimization engine. The DFM engine is designed to perform the DFM simulation using the IC design data and the process data with a set of parameter settings and generating the output data. The optimization engine is designed for generating a performance index of the parameter or the plurality of parameters using the output data and the measurement data and locating a nadir of the performance index of the parameter or the plurality of parameters so that the parameter setting of the process data is optimized.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of optimizing a design for manufacture (DFM) simulation, the method comprising:
receiving an integrated circuit (IC) design data;
receiving measurement data obtained from a wafer corresponding to the IC design data;
performing a DFM simulation on the IC design data to obtain simulated performance data; and
using a computer, optimizing the DFM simulation by determining an adjustment to a parameter of the DFM simulation, wherein the adjustment is determined based on a difference between the measurement data and the simulated performance data, and wherein the adjustment is determined to reduce a difference between the measurement data and a subsequent simulated performance data obtained b performing the DFM simulation on the IC design data utilizing the adjustment; and
optimizing the DFM simulation includes generating a performance index of the parameter by the DFM simulation and wherein the determining of the adjustment to the parameter utilizes the performance index.

2. The method of claim 1, further comprising receiving process data having a parameter, and wherein the performing of the DFM simulation includes generating the simulated performance data using the IC design data and the process data.

3. The method of claim 1, wherein the performance index of the parameter is based on the difference between the measurement data and the simulated performance data.

4. The method of claim 1, wherein the optimizing of the DFM simulation includes performing iterations of DFM simulation using a range of parameter configurations to obtain a performance curve.

5. The method of claim 4, wherein the iterations of the DFM simulation are performed in one of: sequential order, parallel order, and in a combination of sequential order, and parallel order.

6. The method of claim 4, wherein the parameter having the adjustment is determined based on the performance curve.

7. The method of claim 4, wherein the optimizing of the DFM simulation further includes narrowing the range of parameter settings based on the performance curve to produce a second performance curve.

8. The method of claim 7, wherein the optimizing of the DFM simulation further includes narrowing the narrowed range of parameter settings based on the second performance curve to produce a third performance curve, and wherein the adjustment has a value determined using the third performance curve.

9. A method comprising:
receiving an integrated circuit (IC) design data having a feature;
generating an output data by executing a DFM simulation using the IC design data;
receiving measurement data obtained using a processed wafer; and
using a computer, optimizing the DFM simulation, wherein optimizing the DFM simulation includes:
generating a performance index of a parameter of the DFM simulation by comparing the output data and the measurement data; and
determining an optimized value for the parameter based on the performance index, wherein the optimized value is determined to calibrate the DFM simulation by reducing a difference between the measurement data and a result of performing the DFM simulation on the IC design data; and
optimizing the DFM simulation includes generating a performance index of the parameter by the DFM simulation and wherein the determining of the adjustment to the parameter utilizes the performance index.

10. The method of claim 9, wherein optimizing the DFM simulation includes optimizing in one of: a sequential order, a parallel order, and a combination order thereof.

11. The method of claim 9, wherein the generating of the performance index of the parameter includes generating a curve of the performance index using a range of values for the parameter, and wherein the optimized value is determined based on the generated curve.

12. The method of claim 11, wherein the parameter having the optimized value is identified based on the generated curve.

13. The method of claim 11, wherein the generating of the performance index further includes narrowing the range of values for the parameter based on the generated curve, and wherein the optimized value is determined based on the narrowed range of values.

14. A system comprising:
a network system;
a computing system configured to:
connect to the network system,
perform a design for manufacture (DFM) simulation on IC design data to obtain simulated performance data,
compare the simulated performance data to measurement data obtained from a fabricated wafer corresponding to the IC design data, and
based on the comparing of the simulated performance data to the measurement data, determine an adjustment to a parameter of the design for manufacture (DFM) simulation, wherein the adjustment is determined to reduce a difference between the measurement data and subsequent performance data obtained using the IC design data; and
a data storage system configured to connect the network system; and
optimizing the DFM simulation includes generating a performance index of the parameter by the DFM simulation and wherein the determining of the adjustment to the parameter utilizes the performance index.

15. The system of claim 14, wherein the data storage system includes an integrated circuit (IC) design data unit storing the IC design data, a process data unit storing process data including parameter settings, a measurement data unit storing the measurement data, and an output data unit storing the simulated performance data.

16. The system of claim 15, wherein the computing system includes at least one DFM engine and at least one optimization engine.

17. The system of claim 14, wherein the computing system is further configured to perform the DFM simulation by performing iterations of DFM simulation using a range of parameter settings.

18. The system of claim 17, wherein the computing system is further configured to determine a curve based on performing iterations of DFM simulation using the range of parameter settings; and to determine the adjustment to the parameter based on the curve.

19. The system of claim 17, wherein the computing system is further configured to identify the parameter having the adjustment from a plurality of parameters of the DFM simulation based on the curve.

* * * * *